Aug. 10, 1965  V. G. FITZ SIMMONS  3,200,006
METHOD FOR COATING HIGH POLYMERS WITH POLYTETRAFLUOROETHYLENE
Filed Aug. 31, 1961
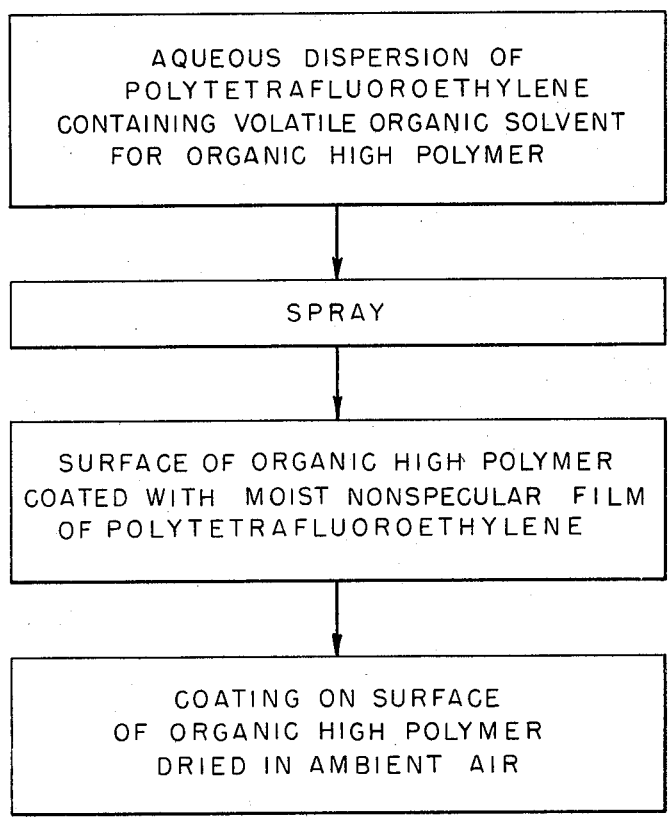
INVENTOR.
VINCENT G. FITZSIMMONS
BY
ATTORNEYS United States Patent Office 3,200,006
Patented Aug. 10, 1965

3,200,006
METHOD FOR COATING HIGH POLYMERS WITH POLYTETRAFLUOROETHYLENE
Vincent G. FitzSimmons, McLean, Va., assignor to the United States of America as represented by the Secretary of the Navy
Filed Aug. 31, 1961, Ser. No. 135,380
4 Claims. (Cl. 117—104)
(Granted under Title 35, U.S. Code (1952), sec. 266)

The invention described herein may be manufactured and used by or for the Government of the United States of America for governmental purposes without the payment of any royalties thereon or therefor.

This invention relates to a method for adhering thin films of polytetrafluoroethylene to solid organic high polymer surfaces.

Polytetrafluoroethylene is a solid material of low coefficient of friction and high resistance to adhesion. Solid organic high polymers desirably are modified by coating a surface thereof with an adherent thin film of polytetrafluorethylene whereby to obtain unitary structures which combine the properties of the high polymer with a surface coating which provides reduced friction and a high resistance to adhesion. The solid organic high polymers are in general heat-sensitive material. For this reason the known method for coating metal surfaces with thin films of polytetrafluorethylene in which the film is sintered to firmly adhere it to the metal is unsuitable as a general method for coating solid organic high polymers with polytetrafluoroethylene due to the high temperature heat involved in the sintering step. Thus, for example, such solid organic high polymers as the synthetic organic elastomers, butadiene-acrylonitile copolymer, butadiene-styrene copolymer and polychloroprene would be injured by the heat involved in sintering the polytetrafluoroethylene film, as would also polystyrene, polymethylmethacrylate, cellulose nitrate, cellulose acetate, cellulose acetate-butyrate and ethyl cellulose.

The present invention has as an object the provision of a method for firmly adhering thin films of polytetrafluorothylene to solid organic high polymer surfaces without involving sintering of the polytetrafluoroethylene.

I have found that thin films of polytetrafluoroethylene can be firmly adhered to solid organic high polymer surfaces without involving sintering of the polytetrafluoroethylene by spray-coating the surface of the high polymer with a small amount of a volatile organic solvent for the high polymer which is sufficient to cause the surface to become tacky and with a water-moist, non-specular thin film of polytetrafluoroethylene of a thickness not over 0.2 mil from the one spray containing both the volatile solvent and an aqueous dispersion of polytetrafluoroethylene, and allowing the coated high polymer to dry in the air for a time sufficient to evaporate a substantial proportion of the water and volatile solvent therefrom.

The method of my invention is illustrated by the flow-sheet of the single figure of the accompanying drawing.

The method of my invention is effective to firmly adhere thin films of polytetrafluoroethylene to solid organic high polymer surfaces through the action of the small amount of the volatile organic solvent for the high polymer which, along with an aqueous dispersion of polytetrafluoroethylene, is deposited on the high polymer surface from the single spray. The solvent, through solvent action, softens or dissolves the surface of the high polymer causing it to become tacky and the tacky surface is penetrated by the aqueous dispersion of polytetrafluoroethylene particles to set up an interface layer between the body of the high polymer and the thin film of polytetrafluoroethylene which is a mixture or emulsion of high polymer, polytetrafluoroethylene, water and solvent. On drying the film-coated solid organic high polymer in air with evaporation of a substantial proportion of the water and solvent therefrom, the system of the interface layer is broken and a solid intermediate layer containing interspersed particles of high polymer and polytetrafluoroethylene is formed integrally with the high polymer and the thin film of polytetrafluoroethylene to bond the thin film to the surface of the high polymer.

Sprayable aqueous dispersions containing polytetrafluoroethylene and the volatile organic solvent which are useful for coating solid organic high polymer surfaces by the method of my invention can be prepared as described in U.S. Patent 2,613,193 to Osdal. The solvent is gradually added to the aqueous dispersion of polytetrafluoroethylene particles and gently stirred to avoid violent movement of the dispersion which tends to cause coagulation. The solvent may be in solution or in emulsion in the aqueous dispersion depending on the particular solvent used. Such aqueous dispersions are used for forming the spray coat on the surface of the solid organic high polymer as contain from about 35 to 60%, preferably about 50% by weight of polytetrafluoroethylene. They may be pigmented or not. The amount of the volatile solvent incorporated into the aqueous polytetrafluoroethylene dispersions may range from about 5 to 20% by volume on the aqueous dispersion. Where the aqueous polytetrafluoroethylene dispersions are not pigmented, smaller amounts of the volatile solvent are added thereto, about 5% by volume thereon, to avoid coagulation of the dispersion. The solvent need only have a solvency power that in small amount, as delivered to the surface of the solid organic high polymer by the spray, it will soften or dissolve the surface of the high polymer and render it tacky. It should have a vapor pressure such that it is volatile at room temperature and thus can be evaporated from the surface of the high polymer on subjecting the coated surface to drying in the ambient air. The well-known solvents, toluene, xylene, acetone and methylethylketone, are suitable solvents for a number of the solid organic high polymers. For example, toluene and xylene are suitable as the solvent for the synthetic organic elastomers, butadiene-acrylonitrile copolymer, butadiene-styrene copolymer and polychloroprene, and for polystyrene and ethylcellulose. Acetone and methylethylketone are suitable solvents for polymethylmethacrylate, cellulose nitrate, cellulose acetate, cellulose acetate-butyrate and ethyl cellulose.

The aqueous dispersion of polytetrafluoroethylene containing the volatile organic solvent may be sprayed to the surface of the solid organic high polymer by known paint-spraying technique using a conventional spray gun of the suction type. The spray cap of the gun is held at a distance from the high polymer surface such that the deposited film of polytetrafluoroethylene is non-specular, although water-moist. A practical spray distance is from about 18 to 24 inches. The term non-specular is used herein in the sense in which it is employed in the art of paint spraying to describe a flat or matte type finish to the coating, i.e. the coating is free from liquid on the surface which would cause it to glisten. The thickness of the film of polytetrafluoroethylene deposited on the surface of the high polymer may be from the 0.1 to 0.2 mil, but should not exceed 0.2 mil. At thicknesses above 0.2 mil, the film will have a ropey structure and not firmly adhere to the surface of the high polymer, but will "pill" and slide-off the high polymer surface on application thereto of sliding thumb pressure, even after it has been air-dried.

Air-drying of the deposited thin film of polytetrafluoroethylene on the surface of the solid organic high polymer may be carried out at about room temperature. The drying is conducted for a time at least sufficient to evaporate a substantial proportion of the water and solvent from the film. At room temperature, a drying period of from about 4 to 6 hours will generally suffice, with variation in the drying period depending upon local atmospheric conditions and the particular solvent and high polymer.

The method of my invention is illustrated by the following specific examples of its application.

*Example 1*

O-rings made of butadiene-acrylonitrile copolymer rubber and ranging in diameter from ½" to 2" and from ⅛" to about ¼" in cross-section of the rubber ring were washed in hot (130° F.) water containing a small amount of detergent (Tide) to remove the antiozonant in the surface of the rubber, rinsed well in tap water and allowed to dry at room temperature. The antiozonant was found to interfere with obtaining a proper coating of the aqueous polytetrafluoroethylene dispersion on the rubber O-rings. To a commercial aqueous dispersion of polytetrafluoroethylene (Teflon Green Primer 850–204 of the Du Pont Company) was added 15% by volume thereon of toluene, the addition being made gradually and with gentle stirring. This modified aqueous dispersion was sprayed to the surface of the washed and dried O-rings in the form of a fine spray from a De Vilbis Aspirating Spray Gun, Type IGA, at a spray distance to deposit on the surface of the O-rings, a non-specular (dull), water-moist thin film of polytetrafluoroethylene of from 0.1–0.2 mil thickness. At the same time, a small amount of toluene was deposited on the surface of the O-rings from the spray. The O-rings with the thin spray-coating of polytetrafluoroethylene and the toluene thereon were allowed to dry in the air at room temperature for a period of from 6 to 8 hours. The coated O-rings were tested for adhesion of the film of polytetrafluoroethylene thereto by submitting them to a cold (tap) water soak for 30 minutes. An improperly adhered coating of polytetrafluoroethylene will come away from the elastomer of the O-ring by this test. The coating in all instances withstood this test and were found firmly adhered to the synthetic rubber of the O-rings.

*Example 2*

An aqueous dispersion of polytetrafluoroethylene (Teflon Green Primer 850–204 of the Du Pont Company) was modified by the addition thereto of 10% by volume thereon of acetone. The addition was made in gradual manner and with gentle stirring of the dispersion. A sheet of polymethylmethacrylate, 4" x 4" x ¼", was sprayed on the one side with the modified aqueous dispersion containing the acetone in the manner of Example 1 to form thereon, a non-specular (flat finish), water-moist spray coat of polytetrafluoroethylene of from 0.1 to 0.2 mil thickness. A small amount of acetone was deposited on the polymethylmethacrylate surface from the spray at the same time. The coated sheet was allowed to dry in the air at room temperature for a period of 4 hours. The air-dried coated sheet was tested for efficacy of the film of polytetrafluoroethylene as a lubricant and non-sticking agent by rubbing the coated side of the sheet against an uncoated sheet of polymethylmethacrylate in frictional type rubbing contact. No welding or seizure occurred between them. The film of polytetrafluoroethylene on the coated sheet remained filmly adhered to the sheet.

The method of the invention may be employed to firmly adhere thin films of polytetrafluoroethylene to solid organic high polymers to obtain unitary structures which offer advantages in lubrication and non-stick not possessed by the solid organic high polymers and will promote the length of their service life. O-rings coated by the method of the invention with a thin film of polytetrafluoroethylene when used as gas seals in essentially dry systems eliminate the adhesion which normally is induced between an elastomeric surface and a metal surface held in a static condition under pressure.

While the invention has been described herein with reference to certain specific embodiments, it obviously may be otherwise practiced without departing from the spirit or scope thereof and, accordingly, it is intended that such embodiments shall be taken by way of illustration and not in limitation except as may be defined in the appended claims.

What is claimed is:

1. A method of coating a surface of a solid synthetic organic high polymer with a thin adherent film of polytetrafluoroethylene which comprises spraying the surface with an aqueous dispersion of polytetrafluoroethylene containing a volatile organic solvent for the high polymer under conditions which result in spray-coating the surface with a small amount of a volatile organic solvent for the high polymer which is sufficient to cause the surface to become tacky and with a water-moist, non-specular, thin film of polytetrafluoroethylene of not over 0.2 mils thickness and drying the film in the ambient air whereby an inherently low friction coating is directly obtained on the high polymer surface.

2. A method of coating a surface of a synthetic organic elastomer with a thin adherent film of polytetrafluoroethylene which comprises spraying the surface with an aqueous dispersion of polytetrafluoroethylene containing a volatile organic solvent for the elastomer under conditions which result in spray-coating the surface with a small amount of a volatile organic solvent for the elastomer which is sufficient to cause the surface to become tacky and with a water-moist, non-specular, thin film of polytetrafluoroethylene of not over 0.2 mils thickness, and drying the film in the ambient air whereby an inherently low friction coating is directly obtained on the elastomer surface.

3. A method as defined in claim 2, wherein the synthetic organic elastomer is a butadiene-acrylonitrile copolymer.

4. A method of coating a polymethylmethacrylate surface with a thin adherent film of polytetrafluoroethylene which comprises spraying the surface with an aqueous dispersion of polytetrafluoroethylene containing a volatile organic solvent for the polymethylmethacrylate under conditions which result in spray-coating the surface with a small amount of a volatile organic solvent for the polymethylmethacrylate which is sufficient to cause the surface to become tacky and with a water-moist, non-specular, thin film of polytetrafluoroethylene of not over 0.2 mils thickness, and drying the film in the ambient air whereby an inherently low friction coating is directly obtained on the polymethylmethacrylate surface.

References Cited by the Examiner

UNITED STATES PATENTS

| | | | |
|---|---|---|---|
| 2,506,165 | 5/50 | Mountcastle | 117—38 |
| 2,613,193 | 10/52 | Osdal | 260—29.2 |
| 2,678,285 | 5/54 | Browning | 117—138.8 |
| 2,711,985 | 6/55 | Olson | 117—16 XR |
| 2,876,131 | 3/59 | Kumnick | 117—47 |
| 2,927,047 | 3/60 | Schulde et al. | 117—138.8 |
| 2,999,764 | 9/61 | Rhoads | 117—47 |

RICHARD D. NEVIUS, *Primary Examiner.*